United States Patent
Beaujard et al.

(10) Patent No.: US 7,350,750 B2
(45) Date of Patent: Apr. 1, 2008

(54) CONTROL SYSTEM FOR AIRBRAKES OF AN AIRCRAFT

(75) Inventors: Jean-Philippe Beaujard, Plaisance du Touch (FR); Marc Audibert, Brax (FR)

(73) Assignee: Airbus France, Toulouse (FR)

( * ) Notice: Subject to any disclaimer, the term of this patent is extended or adjusted under 35 U.S.C. 154(b) by 386 days.

(21) Appl. No.: 11/132,380

(22) Filed: May 19, 2005

(65) Prior Publication Data

US 2005/0263644 A1    Dec. 1, 2005

(30) Foreign Application Priority Data

May 28, 2004   (FR)  .................................. 04 51062

(51) Int. Cl.
*B64B 1/62*   (2006.01)
(52) U.S. Cl. .................. 244/99.12; 244/213; 244/99.9
(58) Field of Classification Search ................ 244/213, 244/99.12, 99.9, 76 R, 220, 214, 227
See application file for complete search history.

(56) References Cited

U.S. PATENT DOCUMENTS

| | | | |
|---|---|---|---|
| 2,466,426 A * | 4/1949 | Hoover | 244/213 |
| 3,618,880 A | 11/1971 | Hagaman et al. | |
| 4,363,098 A | 12/1982 | Buus et al. | |
| 4,591,113 A | 5/1986 | Mabey | |
| 4,783,024 A * | 11/1988 | McDaniel | 244/113 |
| 5,112,009 A * | 5/1992 | Farineau | 244/181 |
| 6,189,837 B1 * | 2/2001 | Matthews | 244/213 |
| 7,108,230 B2 * | 9/2006 | Clark | 244/213 |

* cited by examiner

*Primary Examiner*—J. W Eldred
(74) *Attorney, Agent, or Firm*—Oblon, Spivak, McClelland, Maier & Neustadt, P.C.

(57) ABSTRACT

The present invention relates to a control system for aircraft airbrakes, which comprises control means of a continuous operating mode or of an incremental operating mode in nominal operation of the airbrakes and control means of an incremental operating mode in the event of breakdown.

9 Claims, 8 Drawing Sheets

CONTROL SYSTEM FOR AIRBRAKES OF AN AIRCRAFT

TECHNICAL FIELD

The present invention relates to a control system for aircraft airbrakes.

PRIOR ART

For the most part aircraft use airbrakes to accelerate their descent or decelerate rapidly. Airbrakes are control surfaces whereof the objective is to increase the drag of the aircraft, so as to increase its angle of descent.

Figure 1:
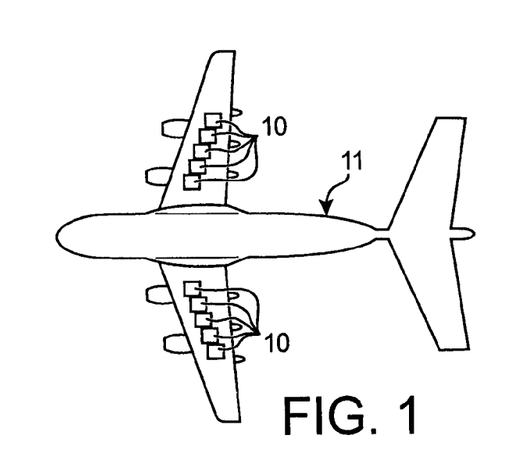
FIG. 1 illustrates the position of the spoilers on an aircraft.

These airbrakes can be <<spoilers>> 10, illustrated in FIG. 1, which are control surfaces placed on the top surfaces of each wing of the aircraft 11.

The control of airbrakes considered hereinbelow, by way of example, is that of spoilers. The extension of the airbrakes corresponds to extending the spoilers. Retraction of the airbrakes corresponds to retracting the spoilers.

As they are engaged these spoilers substantially decrease the lift of the aircraft and substantially increase the drag of the aircraft. In order to compensate the loss of lift, the aircraft must fly at more nosed up incidence, the result of which is even heavier drag.

Control of the spoilers is done by the pilot, or the co-pilot, by means of a lever, according to his preference to descend, decelerate or accelerate. This control implies modification to the aerodynamic characteristics of the aircraft which can be translated by a reduction of the flight field to preserve the safety and comfort of the flight: for example by a restrained choice of flight speeds, or by reduced manoeuvrability.

The spoilers are locked as a function of the control exerted by the pilot. Locking for each corresponding surface corresponds to displacement of the control lever, a priori.

The spoilers are also utilised for other functions:
braking of the aircraft on the ground (specific locking),
rolling motion (in addition to the ailerons when demand is high),
decrease in loads of the wing unit by automatic locking of certain surfaces in the event of pronounced resources.

The extending of spoilers is accompanied by a loss of lift. The aircraft must thus either increase incidence, or accelerate. If the aircraft was previously flying at its maximum incidence, it has no choice but to accelerate. The extending of spoilers is thus accompanied by a reduction in the field of flight in terms of speed.

Similar reasoning can be applied to the manoeuvrability of the aircraft (turning capacity). Turning requires increasing lift and thus incidence. The extending of spoilers limits available incidence and thus turning capacity.

The spoilers thus become a critical function during certain procedures of, for example:
aerial delivery: in effect, there are two principal types of aerial delivery: delivery via gravity and delivery by extraction. Delivery by gravity does not employ extraction parachutes for discharge of loads from the aircraft. The aircraft must thus increase its inclination relative to the horizontal so that this extraction may take place. The pilot can control such an attitude of inclination by way of controlling the airbrakes because the decrease in buoyancy generated by the airbrakes is counterbalanced by an increase in the attitude of inclination.
in flight supply: the airbrakes can be utilised to continuously control the rendezvous between a supply aircraft and a supplied aircraft.

During the course of such procedures, undetected runaway (extension of the spoilers) during rapid approach can be catastrophic.

A first object of the inventive system is to eliminate such a disadvantage.

Figure 2:
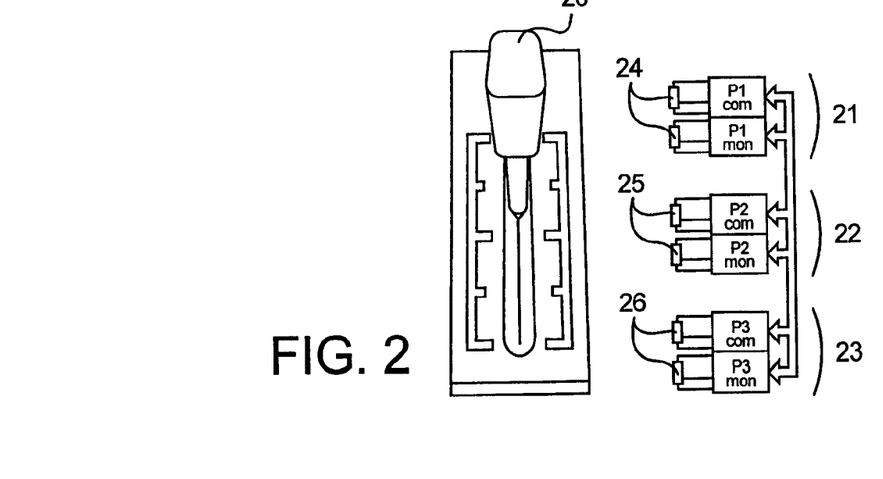
FIG. 2 illustrates control of the spoilers in a system of known type.

According to the techniques of the prior art, to cover safety constraints, each control of the spoilers must be acquired by three computers. When the available space is significant, as illustrated in FIG. 2, the control extension respectively the control extraction of these spoilers, completed using a lever 20, can be constituted by three electric stages 21, 22 and 23 separated so that one stage in breakdown does not affect the two others.

This lever 20, in classic aircraft, is linked to the primary flight control computers. Potentiometers can give an analogue value as a function of the position of this lever which corresponds to the efficacy of aerobraking.

In a device of the prior art three pairs of potentiometers 24, 25 and 26 are utilised. Each pair is dedicated to a primary flight control computer, one being assigned to the control unit (P1com, P2com, or P3com), the other being connected to the surveillance unit (P1mon, P2mon, or P3mon). Each computer feeds each of these potentiometers.

In an aircraft the empty space in the throttle hand lever is limited and it is thus not possible to utilise such potentiometers.

A second object of the invention is to resolve such a problem by creating a function compatible with the abovementioned safety requirements, in the reduced space of the gas throttle lever.

EXPLANATION OF THE INVENTION

The present invention relates to a control system for airbrakes, for example spoilers, of an aircraft, which comprises control means for a continuous operating mode or an incremental operating mode in nominal operation of the airbrakes and control means of an incremental operating mode in the event of breakdown.

According to another advantageous characteristic, the system according to the present invention comprises at least one control assembly with two twin push buttons. A first assembly can be placed on the gas throttle lever on the pilot side, and a second assembly can be placed on the gas throttle lever on the co-pilot side.

In each assembly of two push buttons, the operation of a single push button realises control of the incremental operating mode, and the operation of two push buttons realises control of the continuous operating mode.

At least two computers are each linked to a push button. The two computing stages of each computer receive the outputs of an electric stage of a push button.

In a variant embodiment, in each assembly of two push buttons, with simultaneous activation of the two push buttons the first push button activates an incremental operating mode to a certain threshold, then the second push button activates a continuous operating mode.

The originality of the invention thus comes from the continuous mode which is utilised without breakdown and from the incremental mode which is utilised in the event of breakdown. The invention therefore remains compatible with the abovementioned safety demands.

The originality of the invention also resides in the utilisation of two twin push buttons each containing not three stages but a single stage which reduces the volume necessary for such control.

Such a system enables the airbrakes to be controlled while the pilot presses on the control. It allows a continuous control mode without breakdown and an incremental control mode compatible with a simple breakdown, as an electric stage continues to function. During a double breakdown, two electric stages are erroneous and a computing stage is valid. The computers thus detect incoherence and inhibit the airbrake function (then it is necessary to utilise the push buttons on the co-pilot side, if required). It is only at the third breakdown (or two breakdowns with MEL (list of minimum equipment for which aircraft takeoff is authorised) of equipment) when the computers <<are mistaken>> in their interpretation and can control the airbrakes at an untimely moment. Such a hypothetical case is extremely improbable and thus remains compatible with safety requirements.

DETAILED EXPLANATION OF PARTICULAR EMBODIMENTS

Figure 3:
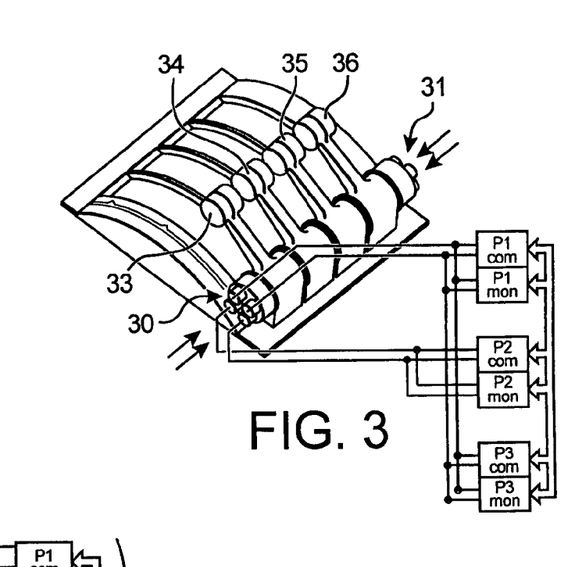
FIG. 3 illustrates the control system of the invention.

In the system according to the present invention, the control lever 20 of the spoilers, used on civilian aircraft and illustrated in FIG. 2, is replaced by two assemblies 30 and 31 of two push buttons arranged on the gas throttle lever 32 on each side of the latter, that is, on the pilot side and on the co-pilot side, to reduce the lack of space existing on the central joystick of the aircraft.

The throttle hand lever 32 is here formed by four levers 33, 34, 35 and 36, each lever corresponding to the control of one o the four motors of the aircraft, such as illustrated in FIG. 1.

Four electric stages, illustrated by dots in FIG. 3, are utilised for each assembly of two push buttons (two stages electric thus corresponding to a push button) and no power supply is required.

An electric stage of each push button is dedicated to two primary flight control computers (<<Primary Flight Control computer>> or PRIM) on the first side of the aircraft (P1 and P3) and the other commutator is connected to a computer on the second side of the aircraft (P2).

The system according to the present invention allows safe piloting control of the spoilers, whereof one false operation could have catastrophic consequences.

Contrary to the systems of the prior art, such as illustrated in FIG. 2, which utilise a three-stage control to ensure a sufficient safety level, the system according to the present invention, by means of an incremental operating mode and a continuous operating mode, ensures such a safety level with two single-stage push buttons. This type of solution is much less cumbersome.

When the pilot, or the co-pilot, effect control by using a single push button the incremental operating mode is used. This means that each press increases the amplitude of the control by a given pitch.

When the pilot, or the co-pilot, acts (by pushing or pulling) on the two push buttons at the same time, it is the continuous operating mode which is used. The amplitude of control increases as the pilot, or the co-pilot, maintains control.

The invention consists of sending discrete signals indicating that the pilot, or the co-pilot, actuates the push buttons. The computers then calculate the corresponding control using logic specific to the knowledge of one skilled in the art.

If each of these two operating modes is analysed more precisely:

Incremental Mode

In this mode only one push button is pressed. Each operation corresponds to one increment.

The corresponding computer takes the control on the rising front of the signal into account.

Runaway, in this mode, is limited to one increment.

Continuous Mode

In this mode each operation of two push buttons corresponds to complete and rapid extension (or retraction) of the spoilers.

The computer takes such control into account when the two push buttons are pressed.

Runaway is then extremely improbable.

Advantageously, because of such a solution, no probable breakdown ends in emplaning of the control nor in blockage of the control. In the event of breakdown the pilot can still use the incremental operating mode and emplaning of the spoilers is necessarily limited.

The push buttons, which send discrete information corresponding to extraction or retraction controls of the spoilers, are passive and require no electric power to function.

Each stage of each push button presents two electric output signals which can be acquired by the computers. It also presents an input signal which can be connected either to earth or connected to a discrete computer output.

Figure 4:
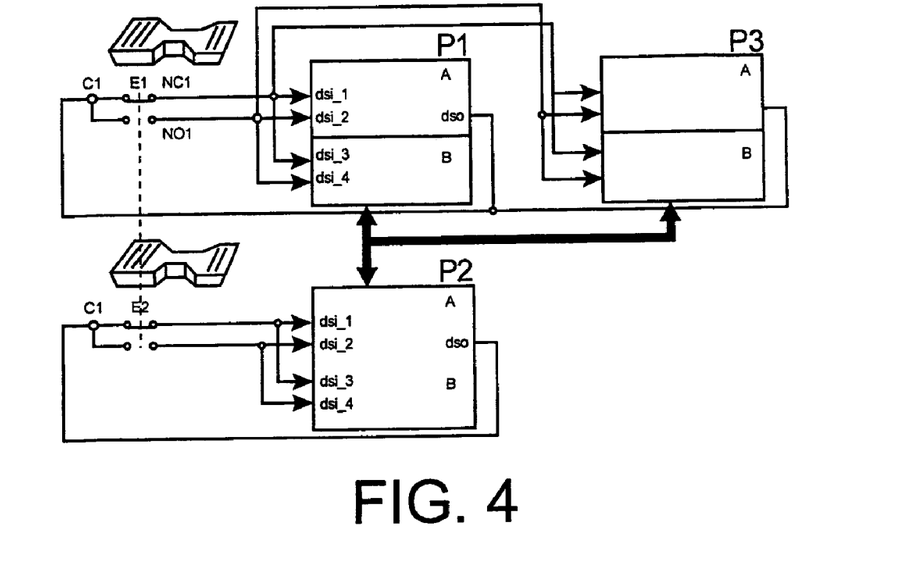
FIGS. 4 to 16 illustrate several breakdown scenarios.
Figure 5:
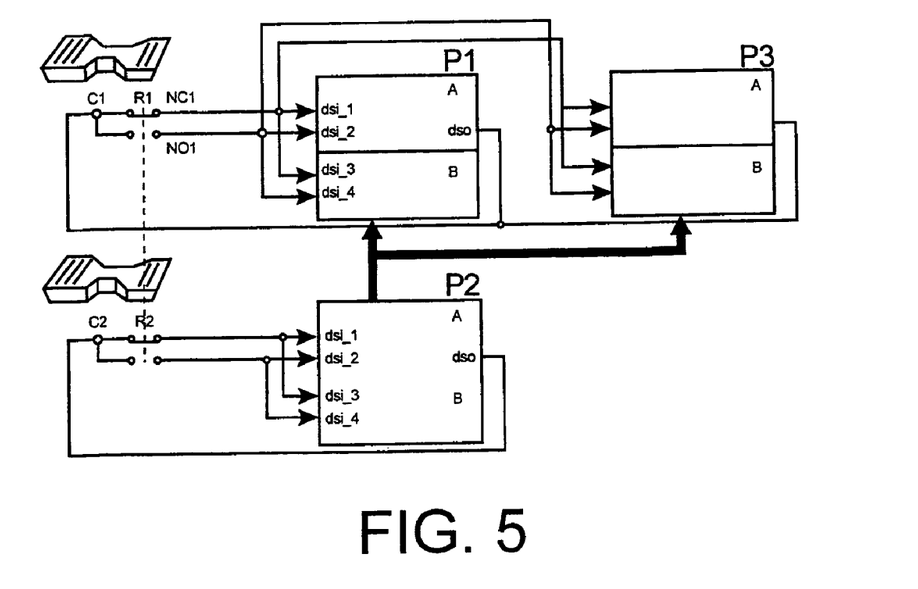

The two computing stages A and B of each computer of primary flight control P1, P2 or P3 receive the two outputs of one stage of the push button for extension control of the spoilers, as illustrated in FIG. 4, or for retraction control of the spoilers as illustrated in FIG. 5. Each computer (P1, P2 or P3) thus directly receives the output signals from one stage of a corresponding push button (two electric signals are acquired to detect isolated faults). In addition, the computers (P1, P2, P3) are interconnected via a bus for example of type ARINC 429.

For as long as the two stages of each push button remain coherent, the control pilot or co-pilot is used as continuous control. The spoilers are extended or retracted for as long as the pilot or the co-pilot continues to operate the push button.

If the two stages are no longer coherent, then the computer orders a single increment when it detects a rising front, and continuous control is lost, even if the pilot or the co-pilot continues to operate the push button, and the spoilers extend or retract by a limited value.

The pilot or the co-pilot must then let the push button return to its resting point to be able to request a new increment by pushing or pulling.

If the computer P1, P2, or P3, which is the master, loses continuous control because a discrete input has failed, it retains control of the spoilers in the incremental mode even if the other computer is in continuous mode.

In a variant embodiment, if the pilot, or the co-pilot, operates the two push buttons simultaneously, the first button activates an incremental operating mode to a certain threshold, then if the pilot, or the co-pilot, goes further the second button activates a continuous operating mode. In this case the manoeuvring efforts are added (characterisation of the angles and manoeuvring efforts happens later).

Breakdown Scenarios

A certain number of breakdown scenarios to which the system according to the present invention can respond will now be considered hereinbelow.

There must be a distinction made between single breakdowns (that is a single breakdown) and double breakdowns (two breakdowns). The latter have a probability lower than the first. The order of magnitude of probability of a single breakdown is $10^{-5}$/hour of flight.

1. Effect of Simple Breakdown

The invention guarantees that there will be no control emplaning of the spoilers, irrespective of the origin of the breakdown. Emplaning is control of the spoilers as far as their limit stop.

When a computer receives basic information originating from two possible sources, it carries out incremental control. This means that it sends a movement limit order on the spoilers and not a continuous order. Also, irrespective of the time during which the pilot is pressing on the control, the order is limited to a certain value. To control the spoilers further, the pilot must release the push button then press it again in order to send a new signal with a rising front.

Architecture with three computers P1, P2 and P3, as illustrated in FIGS. 4 and 5 inevitably results in non-symmetrical operation, since it cannot be accepted for reasons of electric segregation (state of the art in aviation) that a computer acquires the two push buttons at the same time.

Figure 6:
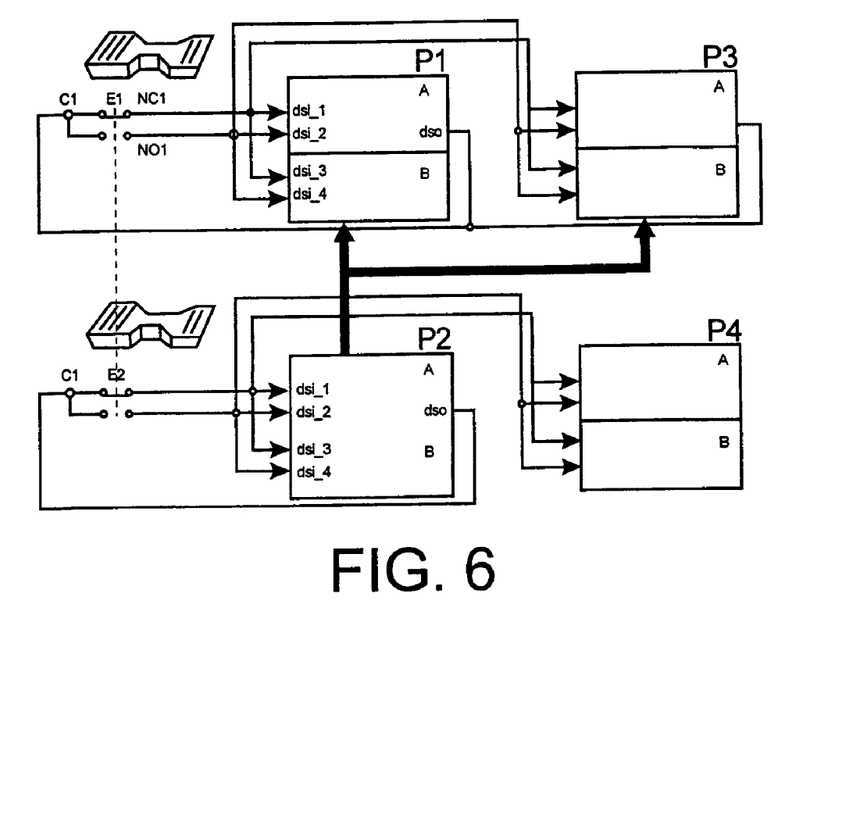

An architecture utilising four computers P1, P2, P3 and P4, as illustrated for example in FIG. 6, can also be selected. Such architecture makes things mush more symmetrical but requires more computers on board the aircraft.

A. Case of Breakdowns Without Impact on Control

The following breakdowns do not have an effect on the airbrake function. This means that the pilot makes use of the incremental mode and the continuous mode at the same time.

Figure 7:
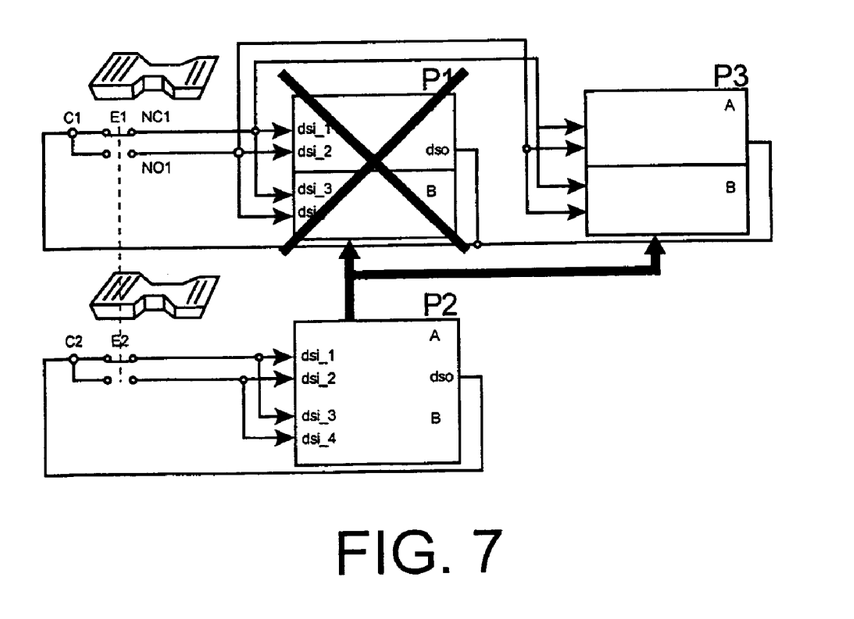

FIG. 7 illustrates a breakdown at the computer P1 which has no effect on the computer P3: for example an open circuit in the acquisition interface of the computer of the computer P1.

Figure 8:
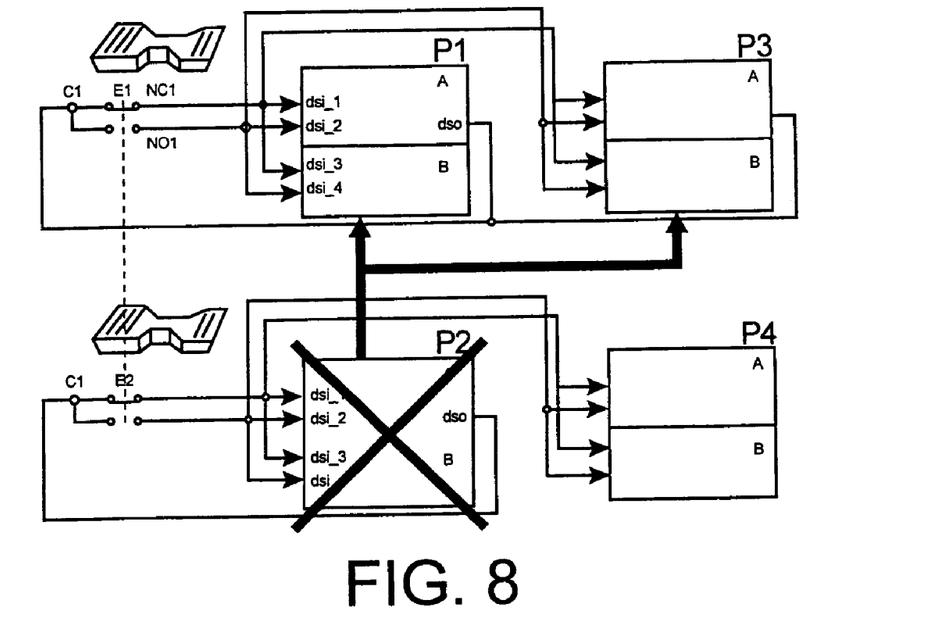

FIG. 8 illustrates the case of architecture with four computers. A breakdown at the computer P2 has no effect on the computer P4: for example an open circuit in the acquisition interface of the computer P2.

B. Case of Breakdowns Causing Incremental Mode

Figure 9:
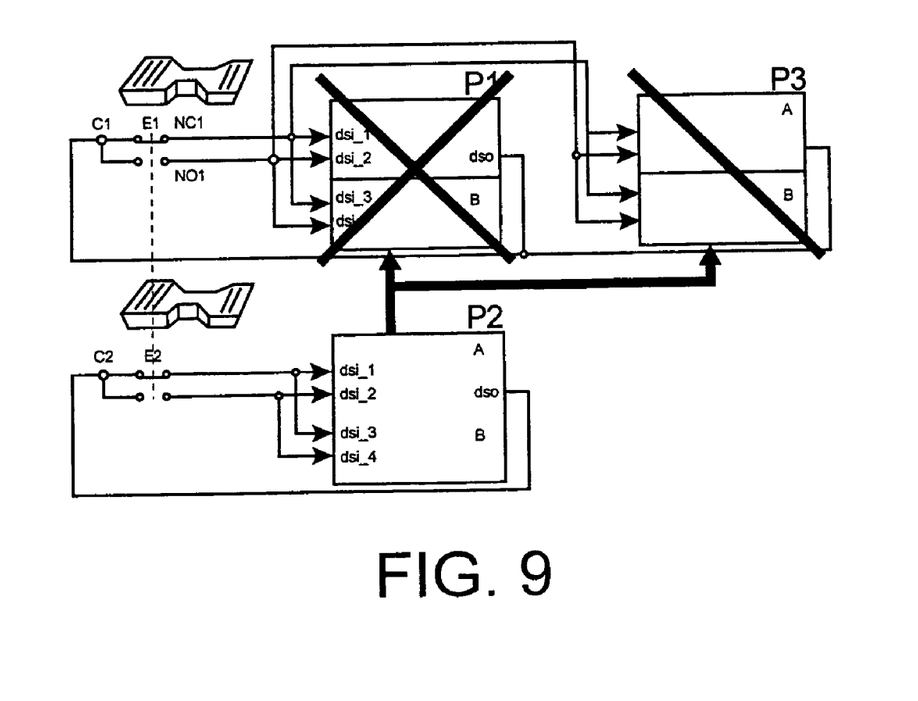

FIG. 9 illustrates a case of breakdown of the computer P1. In this case it is considered that the breakdown is such that the computer P3 can no longer take control of the first push button. These are for example cases of a court-circuit at the level of the interface of the computer P1 which also affect the reading of the computer P3.

Figure 10:
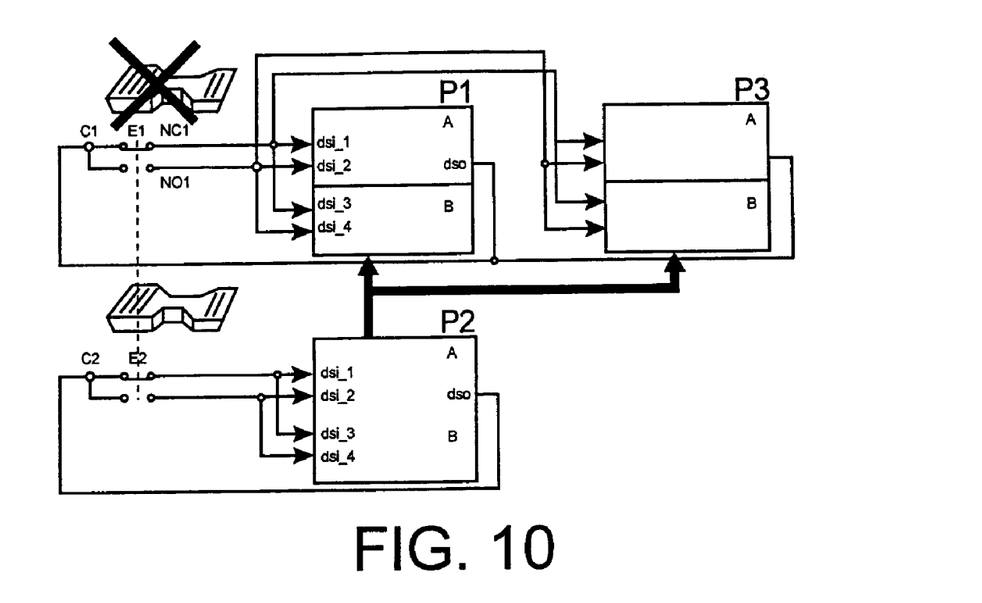

FIG. 10 illustrates a case of breakdown of the first push button.

Figure 11:
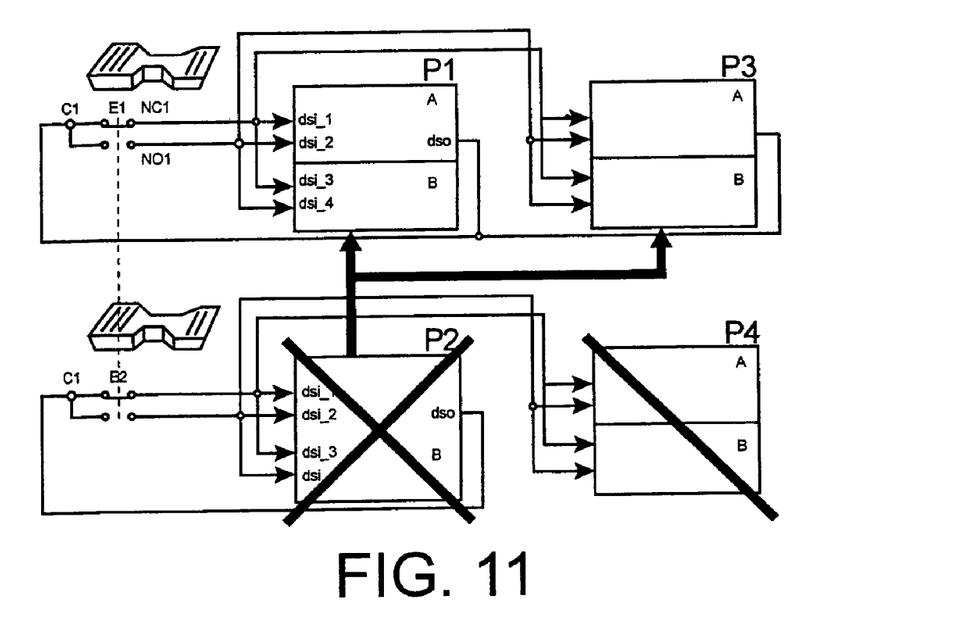

FIG. 11 illustrates a case of breakdown of the second computer P2. In the case of architecture with four computers, it is considered that the breakdown is such that the computer P4 can no longer take control of the second push button. These are for example cases of a court-circuit at the level of the interface of the computer P2 which also affect the reading of the computer P4.

Figure 12:
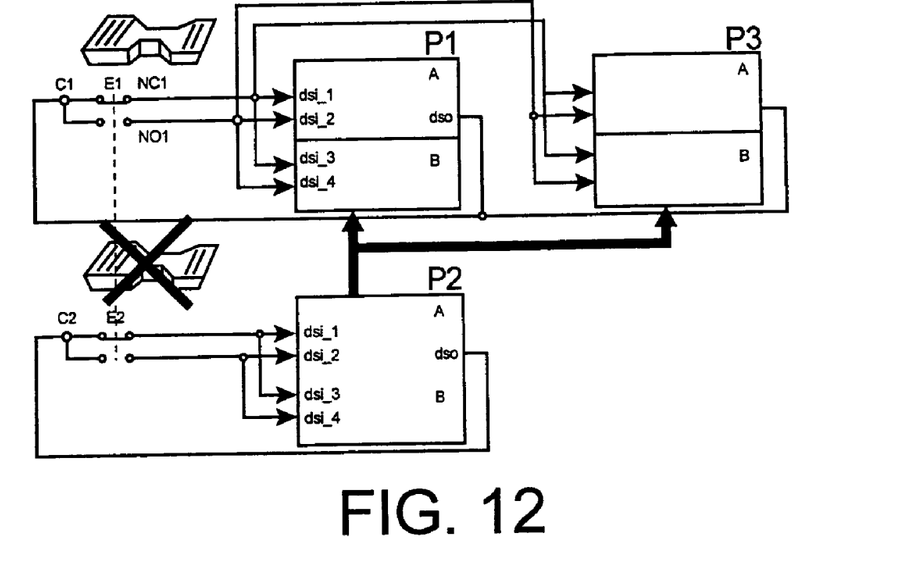

FIG. 12 illustrates a case of breakdown of the second push button.

Figure 13:
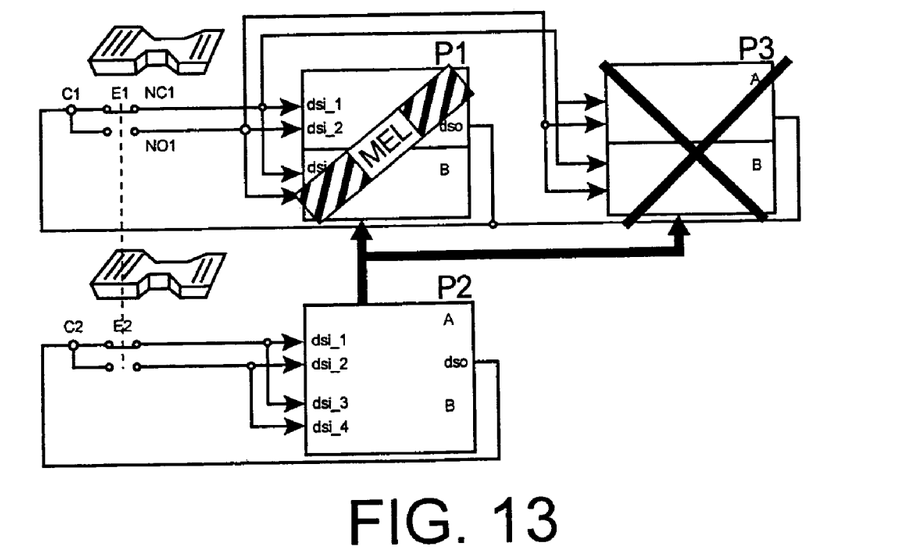

FIG. 13 illustrates a case of breakdown of the computer P3, with MEL of the computer P1. This case corresponds to a breakdown achieved with <<MEL>> of the computer P1: this means that the aircraft is authorised to take off even if the computer P1 is in breakdown. This case clearly corresponds to the case illustrated in FIG. 9.

Figure 14:
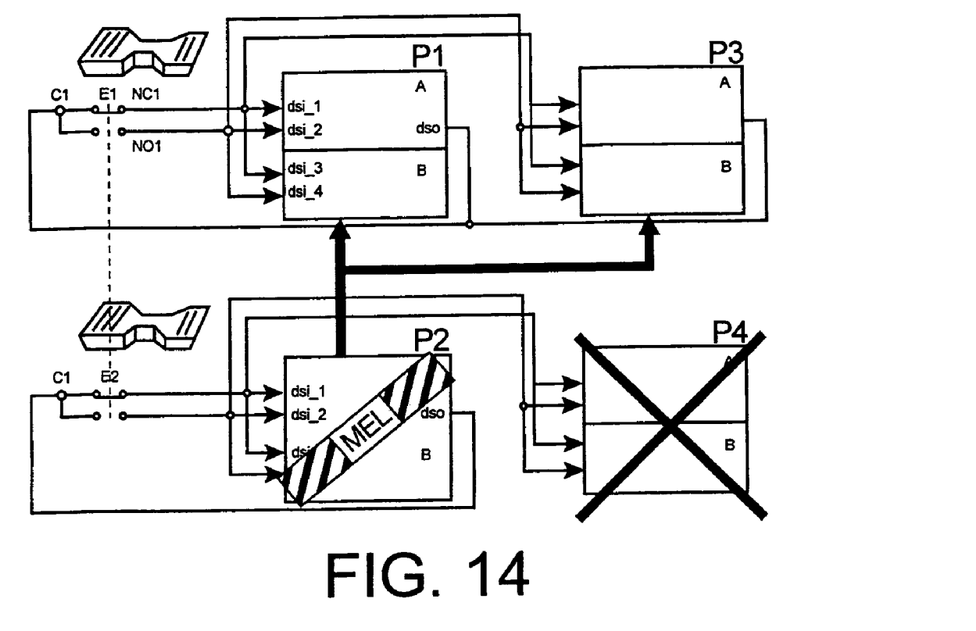

FIG. 14 illustrates a case of breakdown of the computer P4 with MEL of the computer P2. This case, in architecture with four computers, corresponds to a breakdown achieved with MEL of the computer P2. This means that the aircraft is authorised to take off even if the computer P2 is in breakdown. This case clearly corresponds to the case illustrated in FIG. 11.

2. Effect of Double Breakdowns

Certain of these breakdowns can lead to instances of emplaning and thus to consequences affecting safety. But their probability is remote and this probability is compatible with safety objectives.

A. Case of Double Breakdown Without Impact on Control

Figure 15:
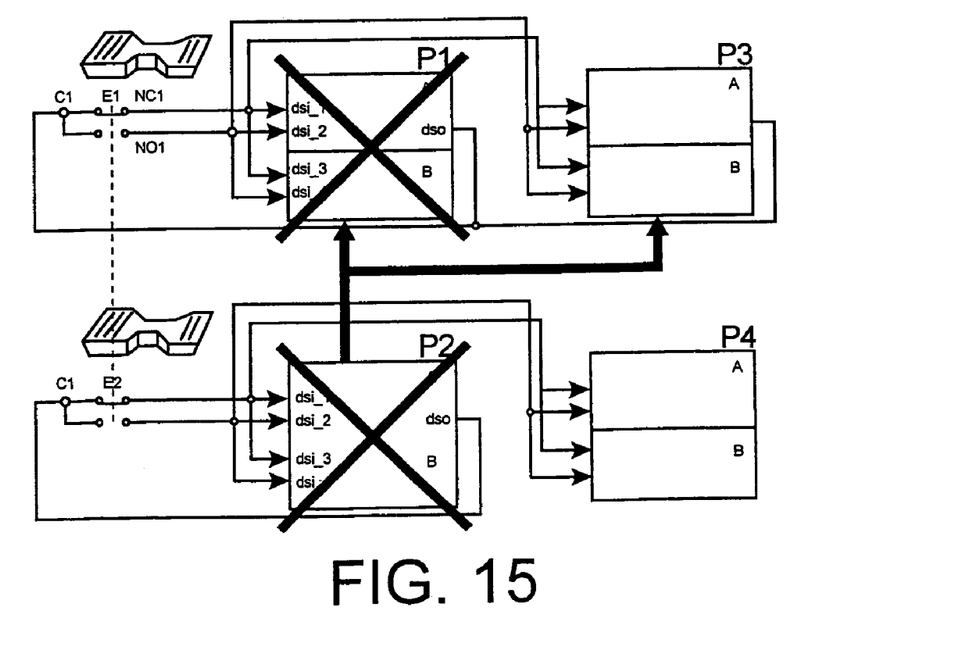

This case corresponds to an architecture with four computers, as illustrated in FIG. 15.

B. Case of Double Breakdown Causing Incremental Mode

Figure 16:
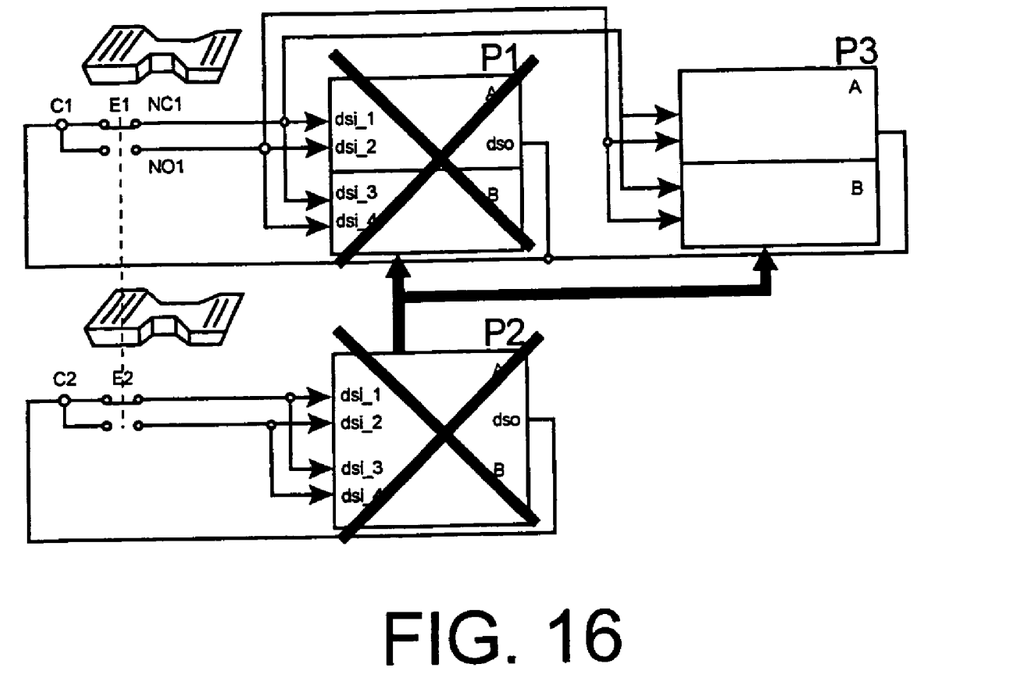

As illustrated in FIG. 16, the computer P3 continues to pilot the second push button incremental in mode as the breakdown of the computer P1 does not cause a readout error on the computer P3.

The invention claimed is:

1. A control system for airbrakes of an aircraft, said control system comprising:
a nominal operation control mechanism configured to control said airbrakes according to a nominal operation mode in nominal operation of the airbrakes; and
a breakdown control mechanism configured to control said airbrakes according to a breakdown mode in the event of breakdown of said nominal operation control, wherein said breakdown mode is an incremental operating mode such that each activation of said breakdown control mechanism corresponds to only an incremental positional change of said airbrakes.

2. The system as claimed in claim 1, further comprising at least one assembly of two push buttons configured to activate said nominal operation control mechanism and said breakdown control mechanism.

3. The system as claimed in claim 1, further comprising first and second assemblies, each assembly being of two push buttons configured to activate said nominal operation control mechanism and said breakdown control mechanism, wherein said first assembly is arranged on a gas throttle lever on a pilot side, and said second assembly is arranged on a gas throttle lever on a co-pilot side.

4. The system as claimed in claim 3, wherein, in each of said first and second assemblies, operation of a single push button activates said nominal operation control mechanism into an incremental operating mode such that each activation of said single push button corresponds to only an incremental positional change of said airbrakes.

5. The system as claimed in claim 3, wherein, in each of said first and second assemblies, operation of two push buttons activates said nominal operation control mechanism into continuous operating mode such that said airbrakes change position continuously during activation of said two push buttons.

6. The system as claimed in claim 1, wherein said nominal operation control mechanism and said breakdown control mechanism share at least two computers each linked to a push button configured to output signals to said two computers.

7. The system as claimed in the claim 1, wherein the airbrakes are spoilers of the aircraft.

8. The system as claimed in the claim 1, wherein said nominal operation mode includes a continuous operating mode such that said airbrakes change position continuously during activation of said nominal operation.

9. The system as claimed in the claim 8, wherein said nominal operation mode further includes an incremental operating mode such that each activation of said nominal operation control mechanism corresponds to only an incremental change of said airbrakes.

* * * * *